United States Patent Office 2,713,592
Patented July 19, 1955

2,713,592

PRODUCTION OF AMINO ACIDS

Forest A. Hoglan, Glenview, Ill., assignor to International Minerals & Chemical Corporation, a corporation of New York No Drawing. Application July 1, 1953,
Serial No. 365,559

14 Claims. (Cl. 260—527)

The instant invention relates to improved processes for the recovery of amino acids. More particularly, it relates to improved processes for the recovery of glutamic acid and for the production of substantially ash-free end liquors from which glutamic acid is recoverable.

Amino acids, such as glutamic acid, are recovered from raw materials containing them, for example from waste liquors of beet sugar molasses, proteinaceous materials, and the like. Glutamic acid is produced by acid or alkaline hydrolysis of proteins and waste liquors, separation of impurities from the resulting hydrolysates, and crystallization of glutamic acid at its isoelectric point. Substantial quantities of glutamic acid fail to crystallize and are therefore not recoverable from end liquors produced by conventional crystallization processes. Continuous attempts are consequently being made to reduce glutamic acid losses in the end liquors produced. Since the content of glutamic acid in the end liquor remains reasonably constant for any given quantity of end liquor, the most successful method of reducing losses has been to reduce the quantity of end liquor to a minimum by concentrating the solutions from which glutamic acid is to be crystallized to the highest possible degree. Under such conditions the quantity of glutamic acid lost in the end liquor is ordinarily between about 25% and about 40% of that originally present in the hydrolysate. The degree to which concentration can be carried is however limited because of organic material present in the hydrolysate, and beyond a certain point the liquor becomes too viscous and thick to permit further processing. Ion exchange treatment is a possible method of recovering the glutamic acid from the end liquor.

Glutamic acid has been separated from solutions containing impurities by ion exchange methods. For example, U. S. Patent 2,375,165, issued to Nees and Bennett teaches a method for producing a solution enriched with glutamic acid, betaine and other nitrogen compounds from a sugar beet waste water by contacting the waste water with a cation exchange material. An intermediate fraction is obtained which contains a substantial portion of the desired nitrogen compounds in addition to lesser amounts of organic and inorganic acids, non-nitrogenous orgaic compounds, and about 10% of the inorganic impurities or ash forming substances present in the original solution. Although this product represents a concentration of the nitrogen compounds from the original solution, the cost of evaporating the water content is substantial, and the presence of the impurities interfered with the subsequent recovery of glutamic acid from the solution.

An improvement over the above process is described and claimed in U. S. 2,586,295, issued to Brown, Nees, and Bennett. In the improved process the nitrogen enriched fraction, as obtained in the process of the former patent, is subjected to cation exchange treatment. The glutamic acid and other nitrogen compounds as well as the inorganic cations are adsorbed by the cation exchange resin, and the glutamic acid and nitrogen compounds are then selectively desorbed while leaving the inorganic cations on the resin. An ion exchange process for glutamic acid recovery from conventional glutamic acid end liquors which contain substantial amounts of ash-forming constituents would not be commercially feasible for the same reasons that subjecting impure solutions containing glutamic acid, such as beet sugar waste liquors to ion exchange are impractical. The impurities, principally inorganic salts which are ash forming constituents, are adsorbed with the glutamic acid and such impurities seriously decrease the capacity of the ion exchange material to adsorb glutamic acid. The glutamic acid which is isolated is highly contaminated with these impurities. Additionally, the cost of reagents used for regenerating the ion exchange resins makes such processes uneconomical in large scale operations.

It is an object of the instant invention to provide improved processes for the recovery of increased yields of glutamic acid from raw materials containing glutamic acid mother substances.

It is a further object of the instant invention to provide commercially feasible processes for the recovery of increased yields of glutamic acid from concentrated Steffen's filtrates and similar waste liquors.

It is a further object of the instant invention to provide improved glutamic acid recovery processes from which substantailly ash free glutamic acid end liquors are produced.

These and other objects of the instant invention will become more apparent upon a fuller understanding of the instant invention as hereinafter set forth.

It is a further object of the instant invention to provide a method for producing substantially ash-free glutamic acid end liquors from which glutamic acid is efficiently separated.

A substantially ash-free glutamic acid end liquor is produced by crystallization and separation of glutamic acid from a hydrolysate, which is prepared in the manner described herein, followed by precipitation of the ash-forming constituents from the resulting end liquor by the addition of methanol at a pH between about 1.0 and about 3.5. Precipitated solid material is separated from the resulting substantially ash-free end liquor.

By the term "glutamic acid end liquor" as used in the description and claims is meant the liquor prepared by hydrolyzing material containing glutamic acid mother substances and from which glutamic acid has been crystallized and separated.

The instant novel process involves hydrolysis of a raw material containing glutamic acid mother substance, removal of at least part of the hydrolytic reagent from the resulting hydrolysate, neutralizing the resulting hydrolysate with sulfuric acid to the isoelectric point of glutamic acid, crystallization and separation of glutamic acid from the liquor, precipitating ash-forming material from the glutamic acid end liquor at a pH between about 1.0 and about 3.5 by adding methanol, and separating solid material which precipitates, for example by filtration.

Substantially ash-free end liquors which contain glutamic acid and other amino acids have uses per se. Alternately the substantially ash-free end liquor is recycled to the glutamic acid recovery process or the glutamic acid is recovered from the glutamic acid end liquor, by subjecting it to an ion exchange treatment. When the glutamic acid present in the demineralized end liquor is recovered in accordance with the instant invention, the overall recovery of glutamic acid from the raw material containing the glutamic acid substance, is increased.

The demineralized or substantially ash-free end liquor contains less than about 1% ash-forming constituents, and for this reason is adaptable to ion exchange treatment for the recovery of glutamic acid and other amino acids. By the term "substantially ash-free end liquor" as used in the description and claims is meant an end liquor containing less than about 1% ash-forming material which is a much smaller percentage than in conventional end liquor. This demineralized liquor is especially suited for ion exchange treatment because the ash forming constituents normally present in glutamic acid containing solutions and which are adsorbed on ion exchange materials along with glutamic acid, have been substantially completely removed from the end liquors. By practicing the instant process, normal yields of glutamic acid are obtained by crystallization at the isoelectric point, and the glutamic acid which is normally present in the end liquor in processes for the recovery of glutamic acid by isoelectric crystallization can be recovered from the substantially ash-free end liquor produced in this process. Ion exchange treatment is a comparatively expensive method for recovering glutamic acid from crude solutions. It is not considered a commercially feasible method to apply to raw materials such as concentrated Steffen's filtrate from which glutamic acid can be recovered by cheaper methods such as by isoelectric crystallization. It is, however, advantageous to apply ion exchange treatment to substantially ash-free solutions which have a glutamic acid content too low to permit satisfactory recovery by conventional crystallization methods.

In one embodiment of the instant invention a waste liquor of beet sugar molasses, from which sugar has been partially or wholly removed, is hydrolyzed with a reagent which is subsequently neutralized and separated as a salt of low water solubility. Sulfuric acid is added to the resulting hydrolysate to reduce the pH to between about 2.5 and about 4.0. Glutamic acid is crystallized and separated from the adjusted hydrolysate. Methanol is admixed with the end liquor at a pH between about 1.0 and about 3.5, preferably between about 2.0 and about 3.5. Treatment with methanol results in precipitation of ash-forming material present in this type of end liquor. Normally between about 25% and about 40% of the glutamic acid initially present in the hydrolysate is present in the glutamic acid end liquor. After it has been demineralized with methanol, the substantially ash-free liquor contains about 90% or more of the glutamic acid initially present in the glutamic acid end liquor. After separation of the precipitate, the methanol is separated from the ash-free liquor, for example by distillation, and the substantially ash-free liquor is recycled to the glutamic acid recovery process or is subjected to ion exchange treatment for the recovery of the glutamic acid present therein.

In a more specific embodiment of the instant invention a waste water of beet sugar molasses, such as concentrated Steffen's filtrate, is hydrolyzed with an alkaline hydrolytic reagent, such as sodium hydroxide, calcium hydroxide, or preferably barium hydroxide. The hydrolysate is neutralized to a pH between about 6 and about 10 with a reagent which forms a salt of low water solubility with the hydrolytic reagent. For example, a barium hydroxide hydrolysate is treated with sulfur dioxide, sulfuric acid, or preferably carbon dioxide, and the insoluble barium salt is separated from the hydrolysate, for example by filtration. Sulfuric acid is added to the resulting filtrate or solution from which the solids have been separated to reduce the pH to between about 4.5 and about 5.5, and the adjusted solution is concentrated to crystallize inorganic salts which are separated, for example by filtration. The resulting solution from which the salts have been separated is adjusted with sulfuric acid to a pH between about 2.5 and about 4.0, preferably between about 3.2 and about 3.6, and glutamic acid is crystallized and the crystals separated therefrom.

If the pH of the glutamic acid end liquor is lower than about 3.5, which is usually the case, the methanol is directly added to the end liquor. If the pH of the glutamic acid end liquor is not within the range of 1.0 to about 3.5, the pH of the end liquor is adjusted to within this range with sulfuric acid, and the methanol is admixed with the adjusted liquor. Between about 1 part and about 3 parts of methanol by volume is added for each part by weight of liquor. The resulting mixture is agitated for several minutes, and the resulting precipitate is separated from the demineralized liquor, for example by filtration.

In one embodiment the demineralized liquor is then passed through a bed or column of cation exchange material operated on the hydrogen cycle. This passage is continued until the capacity of the exchange material to adsorb glutamic acid and other amino acids is such that additional quantities of influent would cause substantial displacement of the amino acids from the exchange material. The glutamic acid and other amino acids are selectively eluted from the cation exchange material by any conventional method, for example by washing the exchange material with a dilute alkaline solution such as an aqueous solution of between about 2% and about 4% ammonia, sodium hydroxide, or the like. Glutamic acid is recovered from the eluate by concentration and crystallization, at its isoelectric point or alternately the eluate is recycled to the glutamic acid recovery process, for example to the hydrolysate.

Conventional cation exchange resins which may be used in practicing the process include those sold under the following trade names: Duolite C–1 and C–3 (by Chemical Process Co.), Catex (by the International Fibers Corp.), Dowex 5 (by Dow Chemical Co.), Amberlite IR 120 and Amberlite IR 100 (by Rohm and Haas Co.), Ionac C–200 (by American Cyanamid Co.), Zeo-Karb (by Permutit Co.) and Nalcite A (by National Aluminate Corp.). The above mentioned exchange resins operate on a hydrogen cycle and have the ability to adsorb cations and nitrogen compounds, such as glutamic acid, betaine, and similar substances. Although the exact composition of the various resins is unknown, they fall in the following categories: zeolite, sulfonated coals, modified phenolaldehyde resins containing sulfonic acid groups, and tannin-formaldehyde resins.

Glutamic acid is also recovered from the substantially ash-free liquors by passing the liquor through anion exchange material. Glutamic acid is adsorbed on the anion exchange material, eluted, then recovered from the eluate. Suitable anion exchange resins which are employed include: Anex (by the International Fibers Corp.), Ionac A–300 (by American Cyanamid Co.), Duolite A–2 (by Chemical Process Co.), Amberlite IRA–400 and IR–45 (by Resinous Products and Chemical Co., Inc.). Although the exact composition of the various resins is unknown, most of them fall in the folowing categories: phenol-aldehyde resins containing either aliphatic polyamines, aromatic polyamines or both, and/or containing basic guanidino radicals.

The glutamic acid is eluted from the anion exchange resins by any of the conventional methods, for example with a dilute aqueous solution of a mineral acid, such as hydrochloric acid or of a strong base, such as ammonia or sodium hydroxide. The glutamic acid is recovered from the resulting eluate by any of the conventional methods. Alternately the eluate is recycled to the glutamic acid recovery process, for example to the hydroylsate.

The raw materials, which contain glutamic acid mother substances, employed in practicing the instant invention are proteinaceous materials, such as wheat gluten, corn gluten, etc., and waste liquors from beet sugar molasses after sugar has been partially or wholly removed. Sugar is removed from the molasses either by precipitation, for example, as an alkaline earth metal saccharate or by fermentation. These waste waters are known, for example as concentrated Steffen's filtrate, vinasse, molasses residues, and schlempe.

In practicing the instant invention the raw material must be hydrolyzed with a reagent which can be precipitated as a salt of low solubility in water-methanol mixtures. For example, the ash-free end liquors which are prepared from sulfuric acid hydrolyzed protein, and from alkaline earth metal hydroxide hydrolysates of waste liquors are suitable in practicing the instant invention.

In the case of waste liquors, such as Steffen's filtrate barium hydroxide is the preferred hydrolytic reagent, however, sodium hydroxide or calcium hydroxide which is a less efficient hydrolytic reagent may be employed. The waste liquor is hydrolyzed by heating at elevated temperatures for a sufficient length of time to substantially completely hydrolyze the glutamic acid mother substances in the waste water. The hydrolysate is neutralized or otherwise treated with a reagent which will precipitate the hydrolytic reagent, for example carbon dioxide, sulfur dioxide, sulfuric acid or sulfite or carbonate salts, and the like may be employed. The insoluble precipitate is then separated, for example by filtration. The resulting solution is adjusted with sulfuric acid to a pH between about 4.5 and about 5.5 preferably about 5, and the adjusted solution is concentrated for example to between about 50% by weight and about 90% by weight of the original concentrated Steffen's filtrate. Precipitated solid material is separated from the solution. Glutamic acid is crystallized from the resulting solution at its isoelectric point.

In practicing the instant invention all pH adjustments with acid are preferably made with sulfuric acid. When sulfuric acid is employed, a substantialy ash-free end liquor is obtained from the demineralizing treatment with methanol. If hydrochloric acid is added to the hydrolysate or end liquor, a substantially ash-free end liquor is not obtained by the demineralizing treatment with methanol.

In another embodiment of the invention a protein, for example, wheat gluten, is hydrolyzed with sulfuric acid. An alkaline earth metal hydroxide, such as lime, is added to the resulting hydrolysate to raise the pH above about 10.0 and inorganic salts are crystallized and separated from the hydrolysate, for example by filtration. The filtrate is adjusted to a pH preferably between about 5.0 and about 7.0 with a reagent such as sulfuric acid, carbon dioxide, or sulfur dioxide, and then filtered to separate precipitated solids. The filtrate is concentrated and sulfuric acid is added to reduce the pH to between about 2.5 and about 4.0 and preferably between about 2.8 and about 3.5. Glutamic acid is crystallized and separated from the resulting end liquor. Between about 0.5 and about 3.0 parts methanol per part of end liquor is added to the glutamic acid end liquor, and precipitated solids are separated from the substantialy ash-free end liquor.

The instant process of methanol demineralization is also applicable to processes in which low ash glutamic acid end liquors are produced from concentrated Steffen's filtrate. For example, the low ash glutamic acid end liquor produced as described and claimed in copending application Serial No. 214,637, filed March 8, 1951, by Forest A. Hoglan, is treated with methanol in accordance with the instant invention. In this process, sulfuric acid is added to concentrated Steffen's filtrate under nonhydrolyzing conditions to obtain a pH between about 2.0 and about 2.9. Insoluble material is separated from the concentrated Steffen's filtrate which is then hydrolyzed with sulfuric acid. Lime is added to the hydrolysate to adjust the pH to between about 5.0 and about 7.0 and insoluble impurities are separated from the neutralized hydrolysate. The hydrolysate is then concentrated and acidified to the isoelectric point of glutamic acid with sulfuric acid. Glutamic acid is crystallized and separated from the end liquor which generally contains between about 4% and about 6% ash-forming materials. This glutamic acid end liquor is then demineralized in accordance with the instant invention by adding sufficient methanol to precipitate the ash-forming materials from the end liquor having a pH between about 1 and about 3.5. The precipitated material is separated from the substantially ash-free liquor from which glutamic acid and other amino acids are recovered by ion exchange treatment.

As a specific example of the process, the following serves merely as illustration, and it is not intended that the scope of the invention be limited thereto.

*Example*

About 200 grams of concentrated Steffen's filtrate having a specific gravity of about 1.32 was mixed with about 40 grams of solid barium hydroxide and about 50 milliliters of water. The resulting mixture was subjected to hydrolysis by heating at about 85° C. for about 2¼ hours. After cooling to about atmospheric temperature carbon dioxide was bubbled into the hydrolysate until the pH reached about 9. Barium carbonate which formed was separated from the hydrolysate by filtration, and the filter cake was washed. About 16 grams of about 50% sulfuric acid was added to the filtrate to reduce the pH to about 5. The adjusted solution was concentrated in vacuo to about 135 grams. Inorganic solids were separated from the concentrated solution by filtration. About 30 grams of about 50% sulfuric acid was added to the resulting filtrate to reduce the pH to about 3.2, and the resulting solution was allowed to stand for about 5 days. Glutamic acid which crystallized from the liquor was separated by filtration. The glutamic acid end liquor was adjusted to a pH of about 2.5 with about 50% sulfuric acid, and it was admixed with about 1 milliliter of methanol per gram of adjusted end liquor. After stirring for several minutes, the precipitate which formed was separated by filtration. On the basis of original end liquor employed the resulting demineralized end liquor contained less than 1% ash and contained about 90% of the glutamic acid initially present in the glutamic acid end liquor.

Having thus fully described and illustrated the character of the invention, what is desired to be secured and claimed by Letters Patent is:

1. In a process for the recovery of glutamic acid involving hydrolysis of a raw material containing glutamic acid mother substance with a hydrolytic reagent, which can be precipitated as a salt of low solubility in a water methanol mixture and which is at least partially precipitated and separated from the hydrolysate as an insoluble salt, crystallization of glutamic acid from the hydrolysate and separation of glutamic acid from a glutamic acid end liquor, the improvements comprising adjusting the pH of the glutamic acid end liquor to between about 1 and about 3.5 with sulfuric acid, adding methanol, and separating the insoluble solids which precipitate from the resulting liquor.

2. In a process for the recovery of glutamic acid involving hydrolysis of a waste liquor from beet sugar molasses, from which sugar has been at least partially removed, with a hydrolytic reagent which can be precipitated as a salt of low solubility in a water methanol mixture, precipitation and separation of at least part of the hydrolytic reagent as a water insoluble salt, acidifying the hydrolysate with sulfuric acid to about the isoelectric point of glutamic acid, crystallization and separation of glutamic acid from a glutamic acid end liquor, the improvements comprising adjusting the pH of the glutamic acid end liquor to between about 1 and about 3.5 with sulfuric acid, adding methanol, and separating the insoluble solids which precipitate from the resulting liquor.

3. In a process for the recovery of glutamic acid involving hydrolysis of a waste liquor from a beet sugar molasses, from which sugar has been at least partially removed, with an alkaline hydrolytic reagent, which can be precipitated as a salt of low solubility in a water methanol mixture, neutralizing the resulting hydrolysate with a reagent which forms a water insoluble salt of the metal of the hydrolytic reagent, separating insoluble solids from the hydrolysate, crystallizing and separating insoluble salts from the hydrolysate, adjusting the pH of the resulting solution to between about 2.5 and about 4 with sulfuric acid, crystallizing and separating glutamic acid from the glutamic acid end liquor, the improvements comprising adjusting the pH of the glutamic acid end liquor to between about 1 and about 3.5 with sulfuric acid, adding sufficient methanol to the adjusted end liquor to precipitate the ash-forming material from said liquor, separating precipitated solids from the substantially ash-free liquor containing glutamic acid and recovering glutamic acid from said liquor.

4. In a process for the recovery of glutamic acid involving hydrolysis of a waste liquor from a beet sugar molasses, from which sugar has been at least partially removed, with an alkaline hydrolytic reagent, which can be precipitated as a salt of low solubility in a water methanol mixture, neutralizing the resulting hydrolysate with a reagent which forms a water insoluble salt of the metal o fthe hydrolytic reagent, separating insoluble solids from the hydrolysate, crystallizing and separating insoluble salts from the hydrolysate, adjusting the pH of the resulting solution to between about 2.5 and about 4 with sulfuric acid, crystallizing and separating glutamic acid from the glutamic acid end liquor, the improvements comprising adjusting the pH of the glutamic acid end liquor to between about 1 and about 3.5 with sulfuric acid, adding sufficient methanol to the adjusted end liquor to precipitate the ash-forming material from said liquor, separating precipitated solids from the substantially ash-free liquor containing glutamic acid, passing the substantially ash-free liquor through cation exchange material operable on the hydrogen cycle which adsorbs glutamic acid from such solutions, discontinuing the passage of the liquor before the capacity of the material to adsorb such compounds is exhausted, eluting the adsorbed glutamic acid from the ion exchange material, crystallizing glutamic acid from the resulting eluate at a pH between about 2.5 and about 4.0 and separating glutamic acid therefrom.

5. In a process for the recovery of glutamic acid involving hydrolysis of a waste liquor from a beet sugar molasses, from which sugar has been at least partially removed, with an alkaline hydrolytic reagent, which can be precipitated as a salt of low solubility in a water methanol mixture, neutralizing the resulting hydrolysate with a reagent which forms a water insoluble salt of the metal of the hydrolytic reagent, separating insoluble solids from the hydrolysate, crystallizing and separating insoluble salts from the hydrolysate, adjusting the pH of the resulting solution to between about 2.5 and about 4 with sulfuric acid, crystallizing and separating glutamic acid from the glutamic acid end liquor, the improvements comprising adjusting the pH of the glutamic acid end liquor to between about 1 and about 3.5 with sulfuric acid, adding sufficient methanol to the adjusted end liquor to precipitate the ash-forming material from said liquor, separating precipitated solids from the substantially ash-free liquor containing glutamic acid, passing the substantially ash-free end liquor through anion exchange material, eluting the glutamic acid from the anion material, and recovering glutamic acid from the resulting eluate.

6. In a process for the recovery of glutamic acid involving the hydrolysis of proteinaceous material with sulfuric acid, neutralization of the hydrolysate, separation of impurities from the neutralized hydrolysate, acidifying the resulting hydrolysate with sulfuric acid, crystallization and separation of glutamic acid from a glutamic acid end liquor, the improvements comprising adjusting the pH of the glutamic acid end liquor to between about 1 and about 3.5 with sulfuric acid, adding sufficient methanol to precipitate the ash-forming constituents present in said liquor, and separating the precipitated solids from the resulting liquor.

7. In a process for the recovery of glutamic acid involving hydrolysis of proteinaceous material with sulfuric acid, neutralization of the hydrolysate with lime, separation of impurities from the neutralized hydrolysate, addition of sulfuric acid to the resulting hydrolysate to reduce the pH to about 3.2, crystallization and separation of glutamic acid from the glutamic acid end liquor, the improvements comprising adjusting the pH of the glutamic acid end liquor with sulfuric acid to between about 1 and about 3.5, adding between about 1 part and about 3 parts methanol per part of liquor, separating the solids which precipitate from the substantially ash-free end liquor, passing the substantially ash-free liquor through cation exchange material operable on the hydrogen cycle which adsorbs glutamic acid from such solutions, discontinuing the passage of the liquor before the capacity of the material to adsorb such compounds is exhausted, eluting the adsorbed glutamic acid from the ion exchange material, crystallizing glutamic acid from the resulting eluate at a pH between about 2.5 and about 4.0 and separating glutamic acid therefrom.

8. A process which comprises hydrolyzing waste liquor from beet sugar molasses, from which sugar has been at least partially removed, with an alkaline earth metal hydroxide, neutralizing the resulting hydrolysate to a pH between about 6 and about 10 with an inorganic reagent which precipitates the alkaline earth metal as a water insoluble salt, separating insoluble solids from the hydrolysate, adjusting the resulting solution to a pH between about 4.5 and about 5.5, crystallizing and separating inorganic salts from the hydrolysate, adjusting the pH of the resulting solution to between about 2.5 and about 4.0 with sulfuric acid, crystallizing and separating glutamic acid from the adjusted solution, adjusting the pH of the glutamic acid end liquor to between about 1 and about 3.5 with sulfuric acid, adding sufficient methanol to the glutamic acid end liquor to precipitate inorganic ash-forming constituents therein, and separating the precipitated solids from the substantially ash-free liquor.

9. A process which comprises hydrolyzing waste liquor from beet sugar molasses, from which sugar has been at least partially removed, with an alkaline earth metal hydroxide, neutralizing the resulting hydrolysate to a pH between about 6 and about 10 with an inorganic reagent which precipitates the alkaline earth metal as a water insoluble salt, separating insoluble solids from the hydrolysate, adjusting the resulting solution to a pH between about 4.5 and about 5.5, crystallizing and separating inorganic salts from the hydrolysate, adjusting the pH of the resulting solution to between about 2.5 and about 4.0 with sulfuric acid, crystallizing and separating glutamic acid from the adjusted solution, adjusting the pH of the glutamic acid end liquor to between about 1 and about 3.5 with sulfuric acid, adding sufficient methanol to the glutamic acid end liquor to precipitate inorganic ash-forming constituents therein, separating the precipitated solids from the substantially ash-free liquor, passing the substantially ash-free liquor through cation exchange material operable on the hydrogen cycle which adsorbs glutamic acid from such solutions, discontinuing the passage of the liquor before the capacity of the material to adsorb such compounds is exhausted, eluting the adsorbed glutamic acid from the ion exchange material, crystallizing glutamic acid from the resulting eluate at a pH between about 2.5 and about 4.0 and separating glutamic acid therefrom.

10. A process for the recovery of improved yields of glutamic acid which comprises hydrolyzing waste liquor from beet sugar molasses, from which sugar has been at least partially removed, with barium hydroxide, neutralizing the resulting hydrolysate to a pH between about 6 and about 10 with a reagent which forms a water insoluble barium salt, separating the insoluble salt from the hydrolysate, adjusting the pH of the resulting hydrolysate to a pH of between about 4.5 and about 5.5, concentrating the adjusted hydrolysate, separating insoluble solids therefrom, adjusting the pH of the resulting solution with sulfuric acid to between about 2.5 and about 4, separating the glutamic acid which crystallizes therefrom, adjusting the pH of the glutamic acid end liquor to between about 1 and about 3.5 with sulfuric acid, adding sufficient methanol to the resulting adjusted solution to precipitate the ash-forming material therein, separating the precipitated solids from the substantially ash-free end liquor, and passing the substantially ash-free liquor through cation exchange material operable on the hydrogen cycle which adsorbs glutamic acid from such solutions, discontinuing the passage of the liquor before the capacity of the material to adsorb such compounds is exhausted, eluting the adsorbed glutamic acid from the ion exchange material, crystallizing glutamic acid from the resulting eluate at a pH between about 2.5 and about 4.0 and separating glutamic acid therefrom.

11. A process which comprises hydrolyzing waste liquor from beet sugar molasses, from which sugar has been at least partially removed, with barium hydroxide, neutralizing the resulting hydrolysate to a pH between about 7 and about 10 with carbon dioxide, separating the insoluble salt from the hydrolysate, adjusting the pH of the resulting hydrolysate to a pH of between about 4.5 and about 5.5, concentrating the adjusted hydrolysate, separating insoluble solids therefrom, adjusting the pH of the resulting solution with sulfuric acid to between about 2.8 and about 3.5, separating the glutamic acid which crystallizes therefrom, adding between about 1 and about 3 parts methanol per part of glutamic acid end liquor to precipitate the ash forming material therein, and separating the precipitated solids from the substantially ash-free end liquor.

12. A process which comprises hydrolyzing concentrated Steffen's filtrate with a hydrolytic reagent selected from the group consisting of sodium hydroxide, barium hydroxide and calcium hydroxide, neutralizing the resulting hydrolysate to a pH between about 6 and about 10 with an inorganic reagent which precipitates with the metal of the hydrolytic reagent as a water insoluble salt, separating the insoluble salt from the hydrolysate, adjusting the resulting solution to a pH between about 4.5 and about 5.5, crystallizing and separating inorganic salts from the adjusted hydrolysate, reducing the pH of the resulting solution to between about 2.5 and about 4.0 with sulfuric acid, crystallizing and separating glutamic acid therefrom, adjusting the pH of the glutamic acid end liquor to between about 1 and about 3.5 with sulfuric acid, adding sufficient methanol to the glutamic acid end liquor to precipitate the inorganic ash-forming constituents therein, separating the precipitated solids from the ash-free liquor distilling the methanol from the substantially ash-free end liquor, passing the resulting liquor through ion exchange material which is capable of adsorbing glutamic acid, eluting glutamic acid from the ion exchange material, and collecting the glutamic acid containing eluate.

13. An improved process for the recovery of glutamic acid which comprises hydrolyzing concentrated Steffen's filtrate with barium hydroxide, neutralizing the resulting hydrolysate to a pH between about 7 and about 10 with carbon dioxide, separating the resulting insoluble salt from the hydrolysate, adjusting the pH of the resulting hydrolysate to between about 4.5 and about 5.5, concentrating the adjusted hydrolysate to between about 60% and about 90% of the original weight of the concentrated Steffen's filtrate, separating insoluble solids therefrom, adjusting the pH of the resulting solution with sulfuric acid to between about 2.8 and about 3.5, separating the glutamic acid which crystallizes therefrom, adding between about 1 and about 3 parts of methanol per part of glutamic acid end liquor, and separating the precipitated solids from the substantially ash-free end liquor.

14. An improved process for the recovery of glutamic acid which comprises hydrolyzing concentrated Steffen's filtrate with barium hydroxide, neutralizing the resulting hydrolysate to a pH between about 7 and about 10 with carbon dioxide, separating the resulting insoluble salt from the hydrolysate, adjusting the pH of the resulting hydrolysate to between about 4.5 and about 5.5, concentrating the adjusted hydrolysate to between about 60% and about 90% of the original weight of the concentrated Steffen's filtrate, separating insoluble solids therefrom, adjusting the pH of the resulting solution with sulfuric acid to between about 2.8 and about 3.5, separating the glutamic acid which crystallizes therefrom, adding between about 1 and about 3 parts of methanol per part of glutamic acid end liquor, separating the precipitated solids from the substantially ash-free end liquor, passing the substantially ash-free liquor through cation exchange material operable on the hydrogen cycle which adsorbs glutamic acid from such solutions, discontinuing the passage of the liquor before the capacity of the material to adsorb such compounds is exhausted, eluting the adsorbed glutamic acid from the ion exchange material, crystallizing glutamic acid from the resulting eluate at a pH between about 2.5 and about 4.0 and separating glutamic acid therefrom.

No references cited.